United States Patent
Sumser et al.

[11] Patent Number: 5,855,117
[45] Date of Patent: Jan. 5, 1999

[54] EXHAUST GAS TURBOCHARGER FOR AN INTERNAL COMBUSTION ENGINE

[75] Inventors: Siegfried Sumser, Stuttgart; Erwin Schmidt, Baltmannsweiler, both of Germany; Marco Schade, Endingen, Switzerland

[73] Assignee: Daimler-Benz AG, Stuttgart, Germany

[21] Appl. No.: 988,275

[22] Filed: Dec. 10, 1997

[30] Foreign Application Priority Data

Dec. 11, 1996 [DE] Germany ................ 196 51 498.3

[51] Int. Cl.⁶ ................................................ F02B 37/12
[52] U.S. Cl. ........................................... 60/602; 415/158
[58] Field of Search ............................ 60/602; 415/157, 415/158

[56] References Cited

U.S. PATENT DOCUMENTS

| | | | |
|---|---|---|---|
| 2,861,774 | 11/1958 | Buchi | 415/158 |
| 4,499,732 | 2/1985 | Szczupak et al. | |
| 5,267,829 | 12/1993 | Schmidt et al. | 415/157 |
| 5,441,383 | 8/1995 | Dale et al. | 415/158 |

FOREIGN PATENT DOCUMENTS

| | | |
|---|---|---|
| 0 051 125 | 5/1982 | European Pat. Off. |
| 0 093 462 | 11/1983 | European Pat. Off. |
| 2633587 | 1/1978 | Germany ................ 60/602 |
| 32 44 928 | 6/1984 | Germany . |
| 43 32 400 | 8/1993 | Germany . |
| 43 15 474 | 9/1994 | Germany . |
| 36 06 944 | 9/1997 | Germany . |
| 2 264 982 | 9/1993 | United Kingdom . |
| 2 312 930 | 11/1997 | United Kingdom . |

*Primary Examiner*—Michael Koczo

[57] ABSTRACT

In an exhaust gas turbocharger turbine for an internal combustion engine including a turbine housing with a turbine wheel disposed therein, an axially movable slide member having a front end with a vane structure is disposed in an annular gap formed in the turbine housing adjacent a radial flow passage leading to the turbine wheel such that the annular slide member is movable between a first position in which its vane structure is disposed in the radial flow passage and a second position in which the vane structure is received within the annular gap and blow off passages which extend through the turbine housing from the radial flow passage through the annular gap to the discharge side of the turbine are opened when the annular slide member is further retracted for discharging gas from the radial flow passage to the turbine discharge side while by-passing the turbine.

2 Claims, 1 Drawing Sheet

EXHAUST GAS TURBOCHARGER FOR AN INTERNAL COMBUSTION ENGINE

BACKGROUND OF THE INVENTION

The invention resides in an exhaust gas turbocharger for an internal combustion engine with a turbine housing including an axially movable slide member with guide vanes movable into, and out of, the exhaust gas flow to the turbine wheel.

Such an exhaust gas turbocharger is disclosed in DE 43 32 400 C1, wherein the exhaust gas turbocharger turbine and the exhaust gas flow can be controlled by the guide vanes of the slide member depending on the operating state of the internal combustion engine. In a low rpm range of the internal combustion engine and during engine braking operation, the guide vane structure is for example inserted into the exhaust gas flow path such that the guide vanes form a radial flow guide structure in the annular exhaust gas admission flow path to the turbine wheel.

In this way, an increased charge air pressure is obtained in the associated compressor since the exhaust gas flow speed into the turbine is increased by the flow guide structure.

In the intermediate and in the upper speed range of the engine, the guide vanes are removed from the exhaust gas inlet passage to the turbine wheel whereby the flow cross-section thereof is increased. In this way, the charge air pressure in the compressor remains within the required limits preventing damage to the turbine components. The axial slide member with the guide vane structure provides actually for a turbine with a two stage operability.

Any exhaust gas turbocharger is to be adapted to the particular operating conditions of the associated internal combustion engine, particularly as far as flow rates and charge pressures are concerned. In order for the compressor to reach a desired charge pressure, the turbine must be designed with a particular excess size. Then however, it is disadvantageous that the efficiency of the relatively large turbine during braking operation of the internal combustion engine is too low. For this reason, it is known to provide various devices and measures which generate a high back pressure in the exhaust of the internal combustion engine whereby the braking power is increased.

Another disadvantage of excess size turbines is that, upon removing the guide vane structure from the radial annular gas admission flow channel, there is a relatively large jump to a lower pressure level. This means that a correspondingly long time is required for reaching a predetermined maximum charge pressure.

DE 32 44 928 discloses an exhaust gas turbocharger for an internal combustion engine wherein an air pressure release line extends between the charge air manifold and the exhaust gas manifold. Excess charge air under pressure can be discharged this way to the turbine exhaust side. In addition, a control valve arrangement is provided including a pressure release valve and a flow control valve.

DE 36 06 944 A1 discloses an exhaust gas turbocharger with a turbine housing which includes a radial gas inlet and an axial gas outlet channel. A bypass line interconnecting the gas inlet and gas outlet channels leads to an annular recess in the wall of the gas outlet channel. For controlling the bypass amount, an annular rotary valve is arranged in the recess and includes a radial control passage which can be brought, by rotation of the annular rotary valve by means of a linkage, into, or out of, alignment with the bypass line discharge opening.

For further general background information reference is made to DE 43 15 474 C1.

It is the object of the present invention to provide an exhaust gas turbocharger which will have a high efficiency during engine braking operation but which nevertheless generates an optimal charge pressure during operation of the internal combustion engine under full load.

SUMMARY OF THE INVENTION

In an exhaust gas turbocharger turbine for an internal combustion engine including a turbine housing with a turbine wheel disposed therein, an axially movable slide member having a front end with a vane structure is disposed in an annular gap formed in the turbine housing adjacent a radial flow passage leading to the turbine wheel such that the annular slide member is movable between a first position in which its vane structure is disposed in the radial flow passage and a second position in which the vane structure is received within the annular gap and blow off passages which extend through the turbine housing from the radial flow passage through the annular gap to the discharge side of the turbine are opened when the annular slide member is further retracted for discharging gas from the radial flow passage to the turbine discharge side while by-passing the turbine.

With the discharge opening in the turbine housing, the turbine is practically a three stage turbine which can adapt to the various operating conditions in an optimal manner. The flow guide structure is used in the known manner only in a relativel low engine speed range when the engine is in an operating mode or in a braking mode where the absorption behavior is low. In a second stage, that is in an intermediate speed range, the vanes of the vane structure are moved out of the annular radial gas admission passage whereby the absorption capacity is increased.

In accordance with the present invention, a third stage is provided wherein the absorption capacity by way of the discharge opening is further increased. This concerns the upper engine speed range, that is, the load range wherein a high absorption capacity of the turbine is advantageous.

An important advantage of the arrangement according to the invention resides in the fact that the turbine can be designed to be smaller. Yet, it can accommodate a larger exhaust gas volume range. In contrast to a turbine without blow-off arrangement, which is designed for the particular rated engine load point as far as desired charge pressure and engine speed adapted to the flow volume through the engine are concerned, the turbine according to the invention can be relatively small but still accommodate a comparatively high flow volume.

In praxis, the exhaust gas turbocharger turbine will be designed with regard to the desired charge pressure for an engine speed in an intermediate range. When then the desired charge pressure is reached at the rated performance point, exhaust gas is discharged directly to the exhaust through the turbine by-pass passage in order to avoid excess charge pressures in the upper engine speed range. In this way, it is prevented that the charge pressure exceeds the given charge pressure limit and damage to the system is prevented.

Another advantage of the arrangement according to the invention utilizing a relatively small exhaust gas turbocharger resides in the fact that the desired charge pressure is obtained more rapidly than in conventional turbocharger arrangements and that the pressure drop is not excessive when the flow guide structure is retracted from the radial flow passage of the turbine. Furthermore, the smaller turbine provides for a substantially improved effectiveness of the engine braking operation.

Because of its relatively small size and accordingly low rotating mass the behavior of the engine during load changes is also improved. Advantageous embodiments of the invention will be described below on the basis of the accompanying drawings showing the invention in principle.

DESCRIPTION OF A PREFERRED EMBODIMENT

Since an exhaust gas turbocharger with an exhaust gas turbine is well known in the art, it is considered to be sufficient to describe below in detail only the components important for an understanding of the invention.

Figure 1:
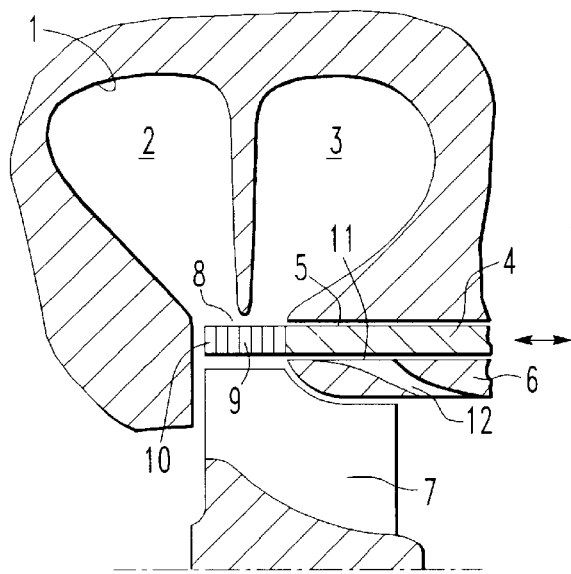
FIG. 1 is a partial cross-sectional view of a turbocharger turbine taken along an axial plane showing an annular axial slide member with flow guide vanes inserted into the radial turbine gas admission passage(first stage).
Figure 2:
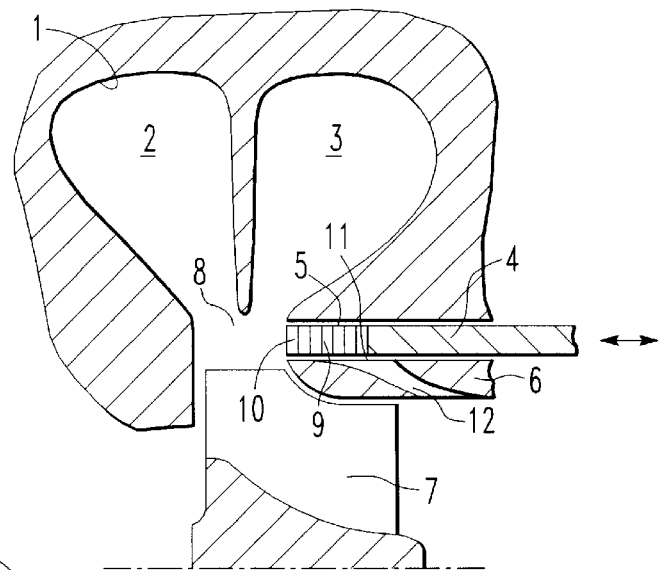
FIG. 2 is a view corresponding to that of FIG. 1, wherein, however, the annular slide member is retracted from the radial turbine gas admission passage (second stage)
Figure 3:
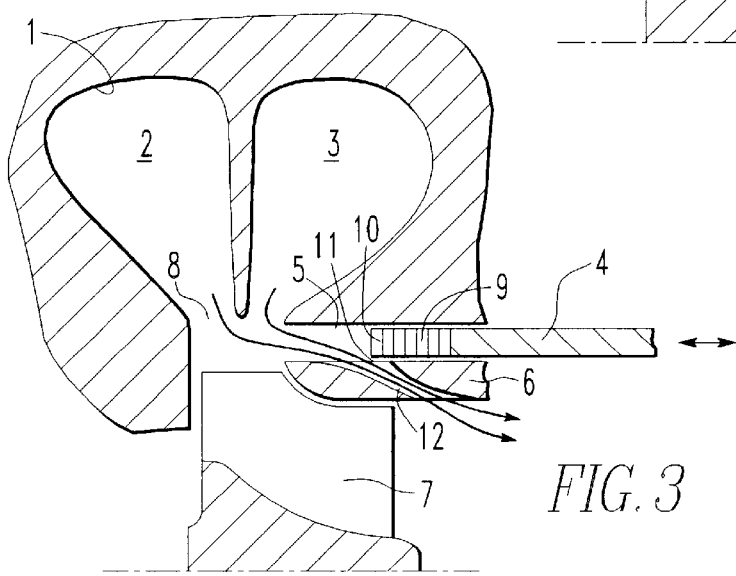
FIG. 3 is a view corresponding to that of FIGS. 1 and 2, wherein the annular slide member is still further retracted so as to open a turbine bypass flow passage through which gas is discharged to the turbine exhaust without flowing through the turbine (third stage).

FIGS. 1, 2 and 3 show a turbine with two inlet flow passages. It is noted, however, that the invention is equally well usable in connection with a turbine having a single inlet passage. The turbine includes a turbine housing 1 with spiral inlet flow passages 2 and 3. A sleeve-like axial slide member 4 is disposed within the turbine in an annular gap 5. The annular gap 5 is formed by the turbine housing 1 and an inner flow guide structure 6. The axial slide member 4 can be moved in axial direction as indicated by an arrow by means of a control mechanism, which is not shown.

Between the turbine housing 1 and a turbine wheel 7, an annular radial flow passage 8 is provided through which gas is supplied from the inlet flow passages 2 and 3 to the turbine wheel 7. The gas flow through the annular radial flow passage 8 can be controlled by the position of the axial slide member 4. At its end adjacent the radial flow passage 8, the axial slide member 4 includes a guide vane structure 9 with guide vanes 10, which direct the gas flow onto the turbine wheel 7 when the guide vane structure 9 is disposed in the radial flow passage 8. The inner flow guide structure 6 includes a blowoff passage 12 having an opening 11 disposed adjacent the annular gap 5 through which gas can be discharged to the turbine exhaust without flowing through the turbine wheel 7. The bypass flow rejoins the turbine exhaust flow downstream of the turbine.

Operation of the exhaust gas turbocharger turbine:

As presented in FIG. 1, the turbine is operated in the first stage wherein the guide vane structure 9 and consequently the guide vanes 10 are disposed in the radial annular flow passage 8. The first stage is used when the engine which is not shown is operating in a low engine speed range and also during engine braking operation. In an intermediate engine speed range, upon reaching a predetermined desired charge pressure and with the engine generating power, the guide vane structure 9 is retracted axially from the radial annular flow passage 8. This reduces the turbine speed resulting in a charge pressure reduction provided by the associated compressor. Such a position in which the guide vane structure 9 is removed from the flow passage 8 is shown in FIG. 2.

FIG. 3 shows the axial slide member 4 in a third stage position where it is still further retracted. In this position, the opening 11 of the blowoff passage 12 is fully exposed so that exhaust gas can flow from the flow passages 2 and 3, by way of the annular gap 5, directly to the turbine exhaust side. This provides for a limitation of the charge pressure. Of course, transition positions for the slide member are possible in connection with the invention, that is, the slide member position may be infinitely variable particularly between the positions as shown in FIGS. 2 and 3. Instead of providing for an automatic exposure of the opening 11 by the retraction of the annular slide member to the third stage position, the opening 11 may be so arranged in the inner flow guide structure 6 that it provides for communication between the annular gap 5, that is, the radial flow passage 8 and the discharge side of the turbine already in the second stage position of the annular slide member 4. In this case, however, another special member such as a gate valve is necessary which opens or closes the blow off passage 12 when operated accordingly.

Furthermore, it is not necessary that the opening 11 and the blow off passage 12 are disposed in the inner guide structure 6. It is important however that, when the vane structure 9 is retracted beyond the position in which it clears the radial flow passage 8, a blow-off passage is opened by way of which exhaust gas can flow directly to the turbine discharge side via the annular gap 5 while by-passing the turbine wheel 7 of the exhaust gas turbocharger.

What is claimed is:

1. An exhaust gas turbocharger turbine for an internal combustion engine including a turbine housing, a turbine wheel disposed in said turbine housing, said housing having, upstream of said turbine wheel, a radial flow passage for supplying gas to said turbine wheel for driving said turbine wheel, an axially movable annular slide member having a front end with a guide vane structure axially movably disposed in said turbine housing in an annular gap formed in said turbine housing adjacent said annular flow passage, such that said annular slide member can be moved between a first position wherein its guide vane structure is disposed within said radial flow passage, and a second position adjacent said radial flow passage in which said radial flow passage is fully open, and, furthermore, a third retracted position spaced from said radial flow passage, and a blow off passage leading from said annular gap to the discharge side of said turbine, said blow off passage being controllable by said annular slide so as to be opened for discharging gas when said annular slide is in said third retracted position for discharging gas from said radial flow passage through said blow off passage to the turbine discharge side while bypassing said turbine wheel.

2. An exhaust gas turbocharger turbine according to claim 1, wherein a flow guide structure is formed around said turbine discharge side and said blow off passage extends from said annular gap to the turbine discharge side through said flow guide structure.

* * * * *